F. M. Shields,
Horse Yoke,
No. 80,674. Patented Aug. 4, 1868.
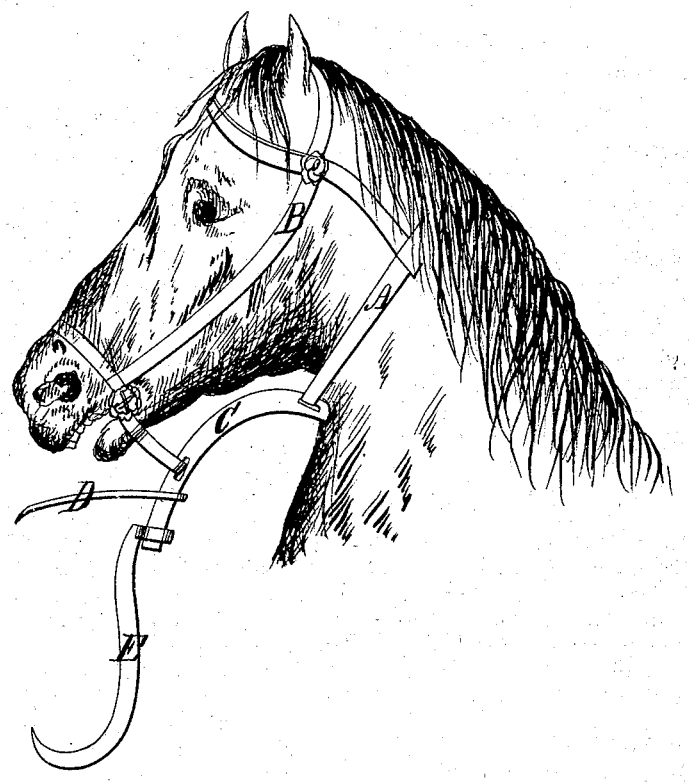
Witnesses:
W. C. Ashkettle
Wm. A. Morgan
Inventor:
F. M. Shields
per Munn &
Attorneys

UNITED STATES PATENT OFFICE.

F. M. SHIELDS, OF MACON, MISSISSIPPI, ASSIGNOR TO HIMSELF AND JOHN W. SANDERS, OF SAME PLACE.

IMPROVEMENT IN YOKES.

Specification forming part of Letters Patent No. 80,674, dated August 4, 1868.

*To all whom it may concern:*

Be it known that I, F. M. SHIELDS, of Macon, in the county of Noxuba and State of Mississippi, have invented a new and useful Improvement in Yokes for Horses and other animals; and I do hereby declare that the following is a full, clear, and exact description thereof, which will enable others skilled in the art to make and use the same, reference being had to the accompanying drawing forming part of this specification, in which the figure represents the head of a horse with my improved apparatus attached thereto.

Similar letters of reference indicate like parts.

The nature of my invention relates to improvements in yokes for horses and other similar animals, which is designed to provide a more effectual means of preventing them from throwing down fences or jumping the same. It consists in metallic hooks, arranged to lie suspended from the heads of the animals in a manner to hook into the fence, to prevent jumping or throwing it down, as will be more fully described on reference to the accompanying drawing.

A represents the neck-strap of a halter, B, from which is suspended a strap of metal, C, by means of an eye in the upper end of the latter, through which the strap passes, which strap may also serve as the throat-latch of a common halter. From the nose-piece of the halter is suspended another strap loosely under the under jaw of the animal, which is passed through another hole in the metal strap, whereon the latter may swing from side to side. From the lower end of the strip are suspended metallic hooks D and E. The hook D projects forward under the nose, and serves to prevent the animal from throwing off the rails with the nose. The hook E hangs downward with the point projecting forward, so as to catch into the fence when the animal attempts to jump over the fence.

If the animal is disposed to jump, only the hook D may be dispensed with, for which reason it is connected to the strap C by a detachable connection of any suitable kind, whereby it may be readily connected or disconnected from the same.

When the animal is grazing the yoke will swing to one side, and drag on the ground in a manner that will not interfere with grazing, and, by reason of the adaptation of my improved yoke to a common halter, it does not chafe or produce any ill effects on the animal.

Having thus described my invention, I claim as new and desire to secure by Letters Patent—

1. The combination, with a halter, of the yoke herein described, consisting of the strip C and hooks D and E, substantially as and for the purpose described.

2. The improved animal-yoke herein described, composed of the strip C, hooks D and E, substantially as and for the purpose described.

The above specification of my invention signed by me this 12th day of March, 1868.

F. M. SHIELDS.

Witnesses:
CHARLES BETTS,
EUGENE FERRIS, Jr.